United States Patent [19]

Hastwell

[11] 4,271,818

[45] Jun. 9, 1981

[54] SOLAR HEATER ROOF-PANEL CONSTRUCTION

[76] Inventor: Peter J. Hastwell, 133 Mills Ter., North Adelaide, South Australia, Australia, 5006

[21] Appl. No.: 916,364

[22] Filed: Jun. 16, 1978

[30] Foreign Application Priority Data

Jun. 20, 1977 [AU] Australia ............................ 0509/77

[51] Int. Cl.³ .............................................. F24J 3/02
[52] U.S. Cl. ................................... 126/417; 126/444; 126/450; 126/448
[58] Field of Search ............... 126/270, 271, 431, 444, 126/450, 417, 432, 448; 237/1 A; 165/485, 49

[56] References Cited

U.S. PATENT DOCUMENTS

| | | | |
|---|---|---|---|
| 4,051,833 | 10/1977 | Vandament | 126/271 |
| 4,062,351 | 12/1977 | Hastwell | 126/444 |
| 4,074,705 | 2/1978 | Robinson, Jr. et al. | 126/271 |
| 4,085,731 | 4/1978 | Weir | 126/271 |
| 4,123,003 | 10/1978 | Winston | 126/271 |
| 4,141,341 | 2/1979 | Eby | 126/271 |
| 4,146,011 | 3/1979 | Thomason et al. | 126/271 |

*Primary Examiner*—James C. Yeung
*Assistant Examiner*—Larry Jones
*Attorney, Agent, or Firm*—Haseltine and Lake

[57] ABSTRACT

A roofing structure in which roofing panels support solar collector plates in cavities in the roofing panels, or formed on the roofing panels, above which are shielding panels which pass solar radiation but prevent water flow into the cavities, so that the solar collector plates are positioned between the shielding panels and the roofing panels with the roofing panels being thermally insulated on their undersides to pass back heat which passes through the solar collector plates.

15 Claims, 10 Drawing Figures

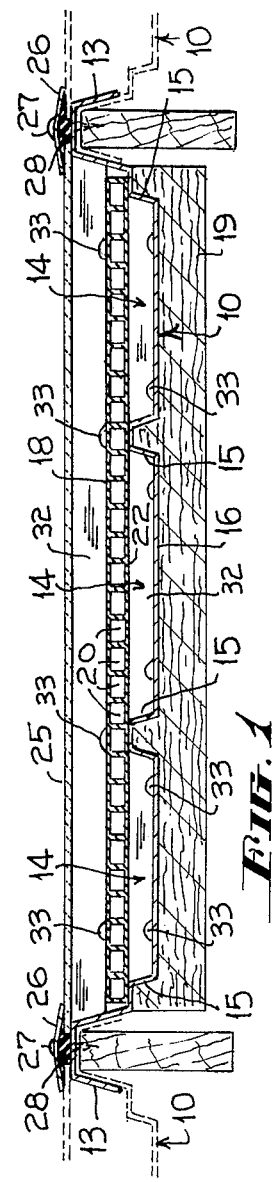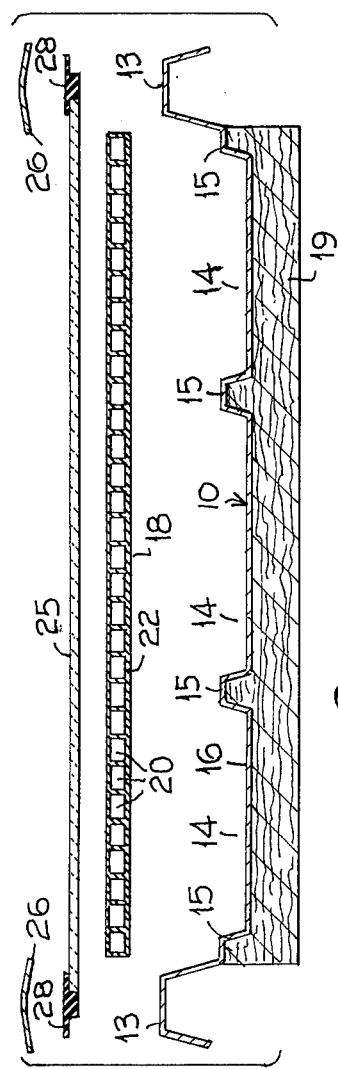

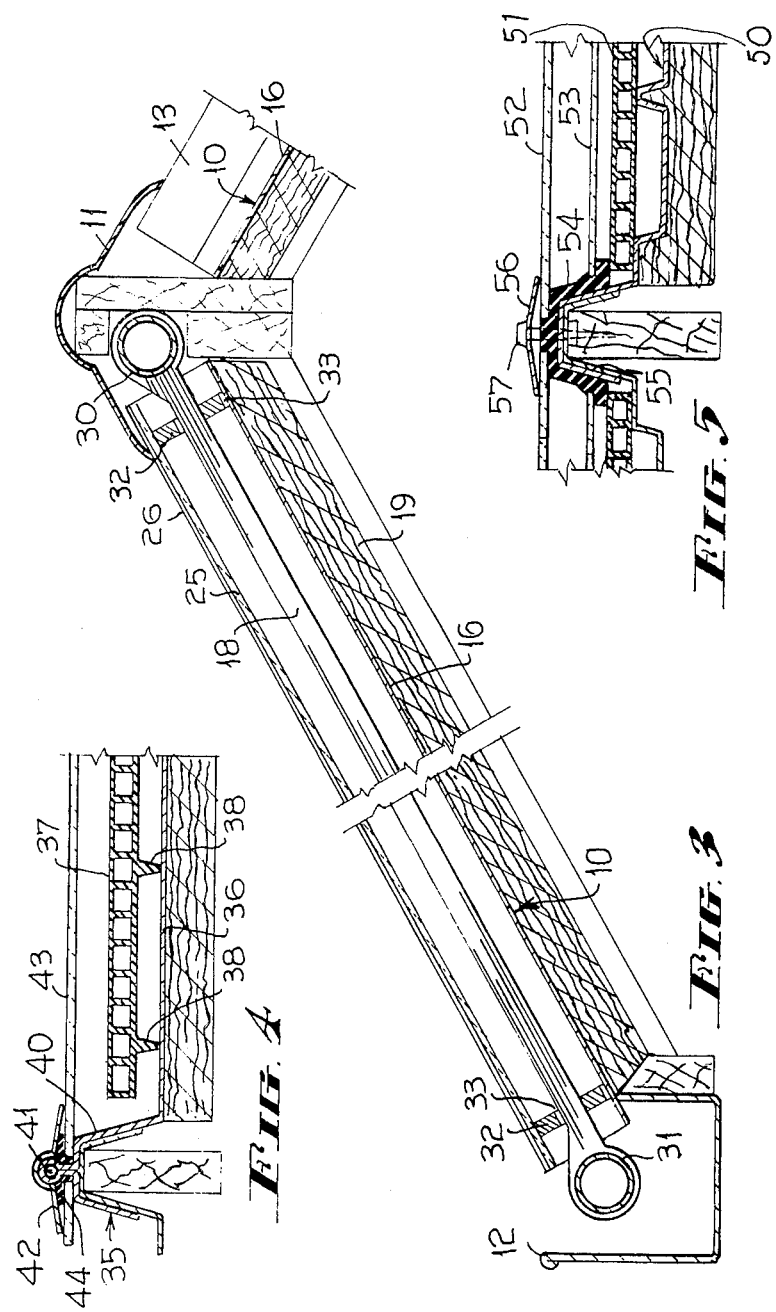

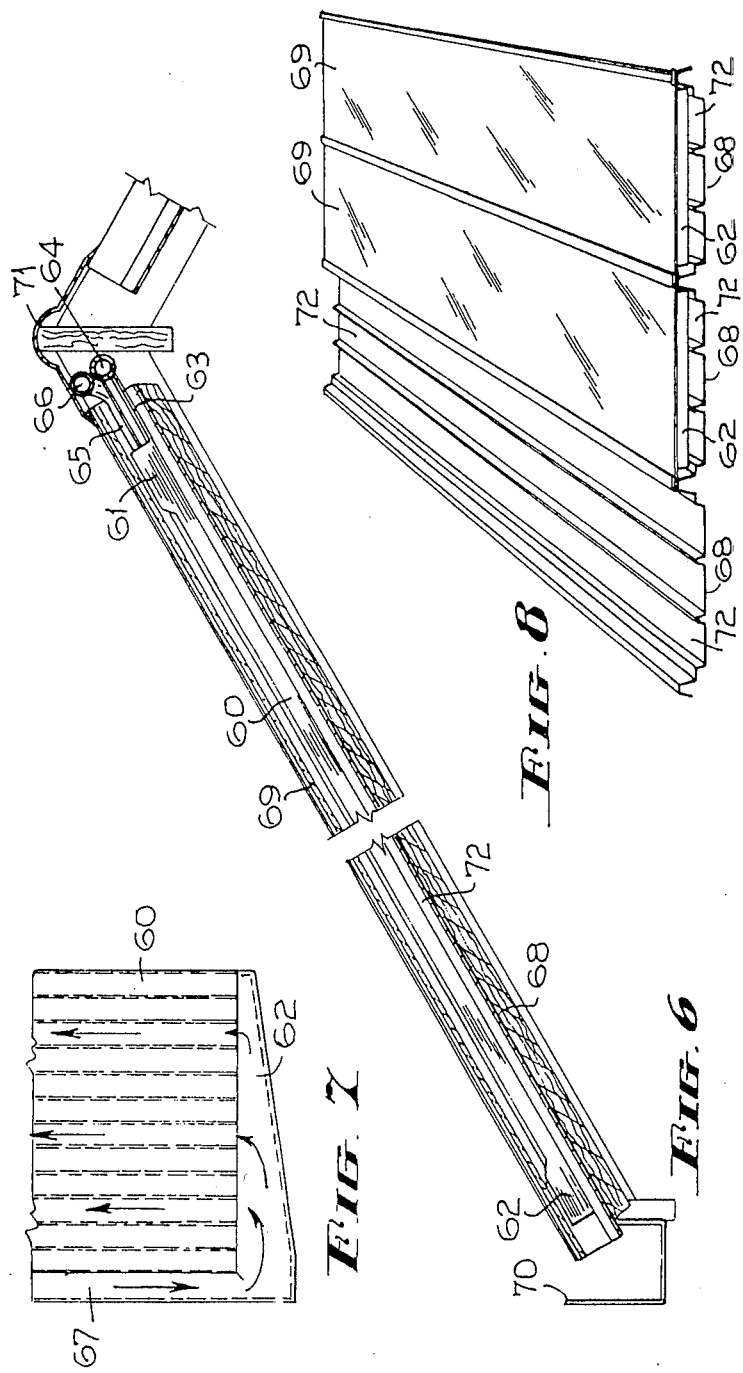

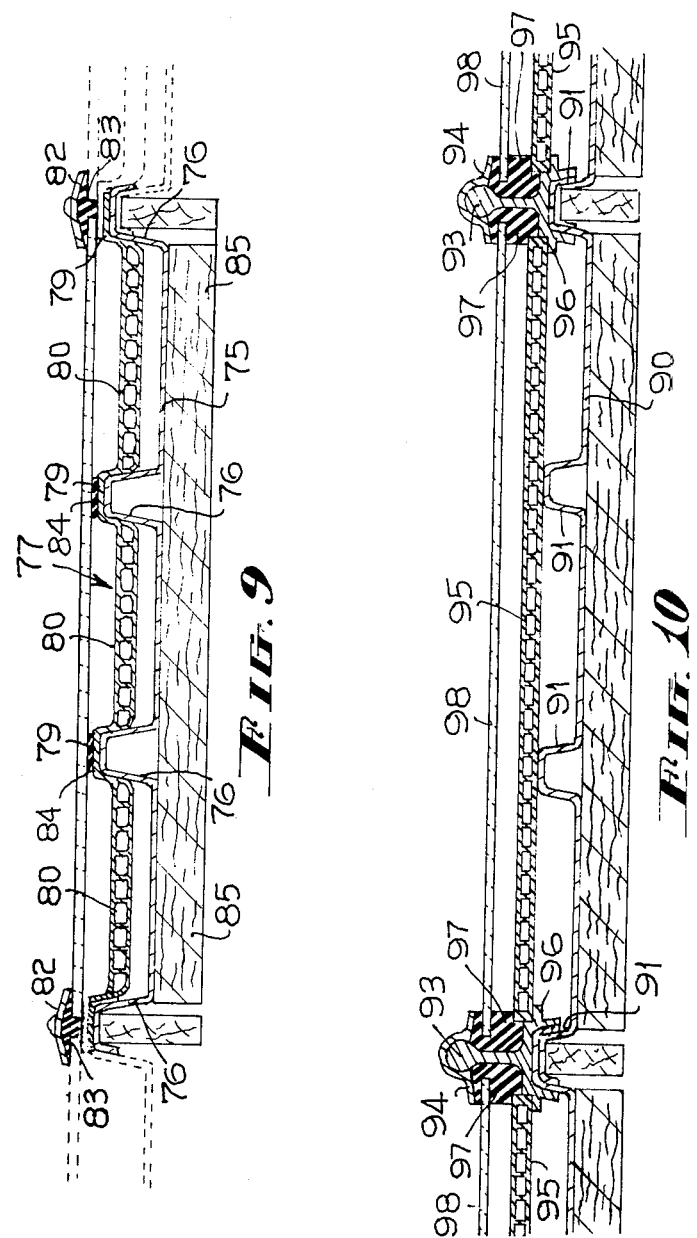

SOLAR HEATER ROOF-PANEL CONSTRUCTION

BACKGROUND OF THE INVENTION

This invention relates to a solar heater roof panel construction.

Solar heaters are used in various ways to produce energy from the sun.

The usual method of positioning the solar heater particularly for domestic use, is to place the heater onto a sloping roof in a position where it receives the maximum radiation from the sun.

Many forms of such panel are already proposed and these usually comprise a weather-proof box-like rectangular housing adapted to fit onto a sloping roof and having within the housing a solar collector plate which consists of a series of channels through which either the water to be heated is passed or through which an absorber fluid is passed which then transfers the heat it receives, by means of a heat exchanger, to the area where the heat is required, the solar collector plate being usually protected by layers of glass or other transparent materials on the front to reduce heat losses caused by the wind and air circulation, and also to trap reradiated energy from the solar collector plate. Heat insulation material is usually placed between the solar collector plate and the box to reduce heat losses through the box.

Units constructed for mounting on a roof generally are relatively expensive because they are self-contained and also they are in many cases aesthetically objectionable because they must be positioned on a part of the roof which faces the sun and generally do not match the roof structure itself in appearance.

OBJECTS OF THE INVENTION

With an object of producing a unit which is of cheaper and more effective construction, and also partly with a view to removing aesthetic objections, the present invention utilises a construction which at least partially embodies the roof structure as part of the solar heater so that it becomes an integral part of a roof.

A further object of the present invention is to so arrange a solar heater unit in association with the roof that a roof can be built in the normal manner and the solar heater added thereto subsequently with a minimum use of materials, cost, structural changes and problems.

SUMMARY OF THE INVENTION

The invention consists in having a roof which can be used in a normal manner, but the roofing panels of the invention are shaped to support the solar collector plate, the roofing panel and the collector plate interacting where both are used, the roofing panels being so arranged that they form drainage means should the solar collector plate leak, the solar collector plates being in turn protected by shielding panels which are supported from the roofing panels and seal to the roofing panels, which shielding panels are transparent to solar radiation to allow the solar radiation to reach the solar panels but form a barrier to prevent wetting of the solar collector plate by rain.

The roofing panels are preferably insulated below their surface to ensure that the roofing panels transfer a maximum amount of heat back to the solar collector plate.

Because of this integrated form of structure of this invention I have found that it is possible to fit a solar heater as part of a roof either at the time that the roof is installed or subsequently, with a minimum of materials, cost, structural changes and problems and also the unit can be made more aesthetic as the panel forms an integral part of the roof when installed. Other advantages which will be apparent from the following description.

The invention can best be brought into effect by utilising roofing panels which are adapted to be positioned on a roof to provide a structure sloping from a ridge cap to a gutter, and the panels are constructed to allow water to flow from the roof to the gutter but the roof panels are so formed that the solar collector plates can fit onto or into the roof between raised ribs, for which purpose the roofing panels may include ribs either formed as part of the roofing panels or attached to the roofing panels, with insulation beneath the roofing panels to reduce heat loss from the panels, which insulation can be independent of the panels or can be subsequently fitted to such roofing panels.

A space is preferably provided between the solar collector plates and the roofing panels to have a heat insulating air barrier sufficient to reduce heat transfer from the solar collector plate to the roofing panels.

The ribs form between them recesses in which the solar collector plates are positioned and these recesses are covered by shielding panels formed of a material which is transparent to the solar radiation and which at that locality forms the drain surface for the roof, but nevertheless as the roof structure remains uninterrupted below the solar collector plate, leakage into the building through the roof does not occur if the solar collector plate itself, or the shielding panel, is damaged. The shielding panels have their edges held in means which lock the shielding panels to the roofing panels.

BRIEF DESCRIPTION OF THE DRAWINGS

FIG. 1 illustrates a roofing panel with a solar collector plate in it with a shielding panel in place on the roofing panel, FIG. 2 shows the components of FIG. 1 separated as prior to assembly, FIG. 3 is a side elevation of a roof constructed according to the invention, FIG. 4 is a fragmentary view of a modified form of roofing panel and solar collector plate, FIG. 5 is a similar fragmentary view of a further modified roofing panel and solar collector plate using two shielding panels, FIG. 6 is a modified form of the roof construction shown in FIG. 3 but to a smaller scale, FIG. 7 is a fragmentary view of a modified solar collector plate, FIG. 8 shows schematically part of a roof according to the invention, illustrating particularly how roofing panels can be used with or without solar heater panels, FIG. 9 is a view similar to FIG. 1 showing a further modification, and, FIG. 10 is a view corresponding to FIG. 5 showing a metal extrusion embodying the sealing means.

DETAILED DESCRIPTION OF THE INVENTION

According to a construction illustrated in FIGS. 1, 2 and 3, the roofing panels 10 extend downwardly from the ridge cap 11 to the gutter 12, the panels 10 having shaped longitudinal upstanding edges 13 which allow each panel to be interengaged with an adjacent panel, the shaped edges 13 being raised a sufficient distance to prevent the inflow of any water to beneath the roofing panel as the water is carried away in drain channels 14 formed between the upstanding edges 13.

The roofing panel 10 has a series of longitudinal ridges 15 upstanding from the bottom 16 for the purpose of stiffening the panel and to form supports to engage the underside of a solar collector panel 18 which is housed in the space between the longitudinal raised edges 13.

The roofing panels 10 have a thermally insulating material 19 on their underside which can either be mounted integrally as shown or can be independently supported by the supports which carry the roofing panels 10 and can be in the form of insulating bats or strips of glass wool, or alternatively the underside of the panels can be sprayed with an insulating material so that when a roof is fixed in position, the roof has the normal function not only of preventing water flow into the structure beneath, but of preventing heat flow from the roofing panels 10 into the structure below, such a roof thus being self-contained and usable as an ordinary roofing structure without solar collector plates being involved.

These roofing panels 10, however, are shaped to accommodate the solar collector plate 18 as illustrated and if the collector plates 18 are matched in shape to the roofing panels 10 a pleasing form of roof construction results whether or not the solar collector plates are used.

The solar collector plate 18 comprises a body of material, moulded or extruded from plastic material or otherwise constructed, which has a series of channels 20 formed therein through which the fluid which collects the solar energy flows, and these plates are preferably of a transparent material with a heat absorber fluid flowing within the channels of the material, or they can be opaque with channels formed therein through which water or other medium flows, the preferred form being one, in the case of heating water for direct use in a household, in which the water flows through the channels 20 in a solar collector plate, which plate has transparent or translucent upper surfaces forming the channels to give direct access of the sun's rays to the water and has an absorber material forming the lower surface 22 of the channel so that heat which passes through the water and is not absorbed by the water is passed back into the water by the heating of the absorber. (See FIG. 11 of U.S. Pat. No. 4,062,351).

In the case, however, where indirect heating of water or the like is to take place, a clear material can be used for the solar collector plate which has formed in it the channels through which an absorber fluid flows, and this fluid as it is heated then transfers the heat in a heat exchanger to water or other medium which is to be heated, and it is to be remembered also that the heat can be applied for heating a structure rather than heating water or the like by either using the heated water or the heat exchanger in the case of the absorber fluid.

The shielding panel 25 is formed of a light-transparent sheet such as glass or plastic and is supported from the roofing panel 10 being secured to the longitudinal edges 13 of the roofing panel 10 by retaining strips 26 fixed to the raised longitudinal edges 13 of the roofing panel 10 by screws 27 or other fixing means, sealing means 28 being inserted between the shielding panel 25 and the roofing panel 10 to prevent leakage of water during rain into the channels 14 of the roofing sheet 10, the shielding panel 25 then giving the necessary run-off of water and the space beneath defines a cavity in which the solar collector plates are housed.

The roofing panels 10 extend, either singly or by overlapping a series of such panels as with normal roofing sheets, between a ridge capping 11 and a gutter 12 and the solar collector plate has an upper header 30 which is accommodated beneath the ridge capping 11 and a lower header 31 adjacent the gutter 12 so that the heat absorbing fluid can be fed to the various units and withdrawn as required.

The lower headers could also be fed by pipes extending from the ridge capping, which pipes could pass down the drain channels alongside of the solar heater plates, and such an embodiment will be described later.

Filler pieces 32 bridge the space between the top of the solar collector plate 18 and the transparent shielding panel 25 and between the bottom of the solar collector plate 18 and the roofing member 10 adjacent to the ridge capping 11 and the gutter 12 to prevent substantial air flow over the solar collector plate 18, apertures 33, see FIG. 1, in the plates controlling the air flow and also allowing draining. There is sufficient air flow to remove condensed moisture by evaporation but the air flow is restricted so that it does not substantially reduce thermal efficiency.

In FIG. 4 the roofing panel 35 has a generally plain bottom 36 and the solar collector plate 37 has a series of webs 38 which extend downwardly to engage the bottom 36 of the roofing panel 35 and thus provide a water flow space beneath the solar collector plate 37 which space corresponds to the water flow channels 14 of the first described embodiment.

In this case the raised longitudinal ridge 40 at least on one side has an upwardly formed bead 41 over which a retaining strip 42 is clipped to hold the shielding panel 43 down. Resilient packing 44 or caulking being used to prevent rain leakage to beneath the shielding panel 43.

In FIG. 5 is shown a modified form in which the roofing panel 50 again supports a solar collector plate 51 but in this case it is protected by a pair of shielding panels 52 and 53, in this case held in place by having their edges engaging resilient supports 54 formed of rubber or a plastic, or a metal form of extrusion containing sealing means which supports 54 can have the edges of the panels 52 and 53 engaged in them prior final positioning on the raised longitudinal edges 55 of the roofing panel. The top shielding panel 52 is held down by a retaining strip 56 held in place by a screw 57 or other fastening and this in turn holds down the resilient support 54 and thus the solar heat panel 51.

FIG. 6 shows a smaller scale a side elevation similar to FIG. 3, but in this case solar collector plate 60 has at its ends headers 61 and 62, the header 61 at the top being connected by a pipe 63 to the fluid outlet line 64, the header 62 at the bottom being connected by a pipe 65 to a fluid supply line 66, the header 62 being formed as shown in FIG. 7 and having a duct 67 connecting it with the pipe 65 which communicates with the fluid inlet line 66.

The roofing panel 68 can be similar in shape to that shown in FIG. 1 and again supports a shielding panel 69 held to the raised edges by suitable means, the gutter being designated 70 and the ridge cap 71.

This form differs from that shown in FIG. 3 in that the solar collector plate 60 can be shorter than the roofing panel 68 as the headers 61 and 62 can be positioned within the drain channel 72 of the roofing panel and need not project into the gutter or be positioned beneath the ridge cap 71.

In FIG. 8 is shown somewhat schematically how the roofing panels 68 of FIG. 6 can be used either without a solar collector plate, the roofing panel on the left being without a solar collector plate but the two roofing panels on the right being fitted with solar collector plates and supporting the shielding panels which ensure that rain is shed by the shielding panels and the recesses in the roofing panels in which the solar collector plates are positioned, are protected against rain water flowing into them as the water sheds over the shielding panels which thus serve the dual function of retaining solar energy at the solar collector plates and form water shedding means to maintain the efficiency of the solar collector plates even in rain.

In FIG. 9 is shown a modified form of roofing panel 75 which has upstanding ridges 76 at spaced intervals and the solar collector plate 77 in this case is in the form of a shaped member which has portions 79 shaped to engage the tops of the upstanding ribs of the panel but the main part of the solar collector plate 77 in which the flow panels are formed projects downwardly as shown at 80 to be held at a small distance above the floor of the roofing panel 75 and in this case the shielding panel 81 lies over the roofing panel 75 and is held down by strips 82 held by screws or other fixing means to the roofing panel, the solar collector plate engaging sealing members 83 at its two edges and resting on pads 84 between the solar collector plate 81 and the tops of the members 84 of the solar collector plate 75.

In this way a normal type of roofing which has thermal insulating means 85 beneath it supports first the solar collector plate and then also supports above the solar collector plate 80 the shielding panel 81 so again while the roofing panels can be of normal construction the solar collector plates can be disposed in recesses formed between the rises 76 of the roofing panel 75 and are protected against water flow by the shielding panel 81 to again give efficient actuation with the solar collector plate 80 and the shielding panel 81 forming an integral part of what otherwise would be a standard roofing panel structure.

In FIG. 10 is shown a further modified form of the invention in which a roofing panel 90 has rises 91 spaced along its length and appropriate rises 91 are engaged by extruded extension members 92 which have at the top a bead 93 which engages a locking strip 94 which clips onto the bead, the solar collector plate 95 in this case resting on the roofing panel rises 91 or on extensions 96 on the extension member 92 and is held in place by a resilient lock 97 which presses onto the solar collector plate 95 at the edges but also has slots 97 which engage the edges of the shielding panels 98 to lock and seal these in place, the member 94 holding the blocks 97 into position.

From the foregoing it will be realized that the present invention relates to a method and means of construction whereby roofing panels are so designed that they can form simple roofing panels or can have solar collector plates associated therewith at required localities so that an integrated structure results in which the roofing panels add to the heat collection and generally assist the solar collector plates and in which aesthetic considerations can be readily obtained in that the structure can show a minimum change at the locality of the solar plates. Similarly a solar collector plate assembly can be added at a later time without generally interfering with the original structure.

The preferred collector panel is made of an extruded plastic material, such as polymethylmethacrylate, polycarbonate, polyphenylsulphone, polysulphone, polyvinyledene fluoride and polyamide, which because of the poor thermal conductivity minimises lateral heat conduction, and conduction through the plastic material to the roofing material.

In the case of where the solar collector plates are formed of a plastic or similar material it is preferred to use a material which has a low heat absorption factor so that when flow of liquid being heated and which is adapted to maintain the temperature of these plates at their correct value is not present, damage of the plates will not result due to the fact that the plates do not absorb heat, and in such a case heat absorption is from an absorber flowing through the channels of the solar collector plates.

I claim:
1. A sloped roofing structure comprising:
   (a) a plurality of roofing panels each defined by a floor and at least two upwardly extending marginal edges having upstanding ridges, the ridges of adjacent panels are fitted together and said panels are sloped to form a drain surface to shed water from a roof so formed,
   (b) a plurality of independent transparent or translucent solar collector plates having flow channels therethrough for passage of a medium to be heated by solar radiation, said solar collector plates extending up the slope of said roofing structure and being disposed within said roofing panels spaced over the floor to form a clearance therebetween, whereby, solar energy which passes through the channels of the said collector plates is returned at least in part from the floor of said roofing panels to said independent solar collector plates, and
   (c) transparent shielding panels, said transparent shielding panels pass solar radiation disposed over the said solar collector panels, and are sealed to and supported by said roofing panels over said collector plates, whereby said collector plates are disposed in cavities formed between said roofing panels and said shielding panels, said shielding panels form the drain surface above said cavities, and whereby said roofing panels discharge leakage from said solar collector plates through said clearance.

2. A roofing structure according to claim 1 wherein the said upstanding ridges are upformed interengaging longitudinal edges on the said roofing panels.

3. A roofing structure according to claim 1, wherein: said upstanding ridges are separately attached to the said roofing panels and are sealed to the said transparent shielding panels.

4. A roofing structure according to claim 1, 2 or 3 wherein the said roofing panels are thermally insulated on their undersides.

5. A roofing structure according to claim 1 wherein the said solar collector plates include upper and lower headers which communicate with the said channels, whereby a liquid can flow from one header to the other through said channels, and pipe means connected to the said headers to feed a liquid to one said header and collect it from the other said header.

6. A roofing structure according to claim 5 wherein the said solar collector plates are raised above the said roofing panels by ridges on the said roofing panels or depending supports on the underside of the said solar collector panels whereby confined air spaces exist above and below the said solar collector plates within the said cavity.

7. A roofing structure according to claim 6 wherein the said air spaces are closed by members at least at one end of the said cavity, said member or members being apertured to control air flow through the said cavity.

8. A roofing structure according to claim 7 wherein the said members are formed by headers at each end of the said solar collector plates, at least one of which headers substantially fills the cross-sectional area of the said cavities.

9. A roofing structure according to claim 1 wherein the said solar collector plates have a header at each end which communicate through the said channels, the header at one end being disposed in a gutter at the lower end of the said roofing members and the header at the other end being disposed in a ridge cap at the upper end of said roofing members.

10. A roofing structure according to claim 1 wherein the said ridges are formed by upstanding members which engage the said roofing panels and support the said solar collector plates and include resilient sealing members which are locked to the said upstanding members to hold down the said solar collector plates and engage and hold the said shielding panels.

11. A roofing structure according to claim 1 wherein the said solar collector plates are formed of a plastic generally transparent to solar rays with an absorber on the underside.

12. A roofing structure according to claim 1 wherein the said solar collector plates are formed of a plastic generally transparent to solar rays, and the said roofing panels are reflective, whereby an absorber fluid can be circulated through the said solar collector plates to absorb solar energy.

13. A roofing structure according to claim 1 wherein the said solar collector plates each have at each end a header, and wherein at least the lower header is connected to a liquid supply pipe through one of the channels in the said solar collector plate which by-passes the other said header, whereby the said solar collector plate can have liquid circulated through it by pipes connecting to one end only.

14. A sloped roofing structure in combination with a ridge cap and gutter, further including:
  (a) a plurality of roofing panels having ridges running from said ridge cap to said gutter to thereby form cavities down which water is guided to the said gutter,
  (b) thermal insulation on the underside of the said roofing panels,
  (c) a plurality of independent solar collector plates having fluid flow passages therethrough disposed in at least some of the said cavities, and
  (d) a transparent shielding panel which passes solar radiation closing the top of each of the said cavities in which an independent solar collector plate is disposed, whereby said roofing panels shed water to the said gutter excepting where said solar collector plates are positioned at which locality said shielding panels shed the water to said gutter outside of the said cavities, but wherein water leakage from the said solar collector plate or shielding panels is shed to the said gutter by the said roofing panels.

15. A roofing structure according to claim 14 wherein the said solar collector plate is raised from the bottom of the said cavities.

* * * * *